United States Patent [19]

Groves-Kirby et al.

[11] Patent Number: 4,993,797
[45] Date of Patent: Feb. 19, 1991

[54] OPTICAL FIBRE LATTICE SIGNAL PROCESSORS

[75] Inventors: Christopher J. Groves-Kirby, Northampton; Douglas C. J. Reid, Warwickshire, both of England

[73] Assignee: Plessey Research Caswell Limited, Ilford, England

[21] Appl. No.: 533,831

[22] Filed: Jun. 6, 1990

[30] Foreign Application Priority Data

Jun. 13, 1989 [GB] United Kingdom ................. 8913555

[51] Int. Cl.$^5$ .............................................. G02B 6/26
[52] U.S. Cl. .................................. 350/96.15; 350/96.16
[58] Field of Search ........................... 350/96.15, 96.16

[56] References Cited

U.S. PATENT DOCUMENTS

| | | | |
|---|---|---|---|
| 4,778,239 | 10/1988 | Shaw et al. | 350/96.16 |
| 4,784,453 | 11/1988 | Shaw et al. | 350/96.16 |
| 4,934,777 | 6/1990 | Jou et al. | 350/96.15 |

Primary Examiner—Frank Gonzalez
Attorney, Agent, or Firm—Fleit, Jacobson, Cohn, Price, Holman & Stern

[57] ABSTRACT

The optical fibre lattice signal processor comprises at least two coupling devices through which two optical fibres pass in a manner permitting optical coupling therebetween. The optical coupling devices are arranged in parallel with respect to each other and each fibre experiences a 180° turn between the couplers. Recursive and non-recursive arrangements are provided for, together with equal and arbitrary delays.

7 Claims, 6 Drawing Sheets

OPTICAL FIBRE LATTICE SIGNAL PROCESSORS

The present invention relates to optical fibre lattice signal processors which use fibre lattice structures.

Lattice structures find application in signal processing for a number of reasons. For example, they permit a systematic approach to processor synthesis, they have straightforward implementation, they are regular and modular, i.e. implementation and analysis is generally by cascading of identical or related topologies, they possess convenient numerical properties, rendering them appropriate for digital applications and they provide a natural model for many important physical and mathematical phenomena and are useful in estimation problems.

In addition to these general properties, fibre lattice structures exhibit further advantages making them attractive for many signal processing functions:

Outputs are contained in a single fibre, facilitating the detection process.

All summations are performed optically, within the fibre, making the systems more efficient.

In fibre implementation, basic lattice components are monomode fibres and 4-port directional couplers. These are used in combination to form the two classes of 4-port processing element, namely two-coupler recirculating (recursive or feed-backward) and two-coupler non-recirculating (non-recursive or feed-forward) delay lines, indicated schematically in FIG. 1. These 4-port elements form the basic building blocks of more complex lattice structures, higher order lattices being simply achieved by concatenation of appropriate basic elements.

In the two-coupler recursive delay line, (FIG. 1(a)), a monomode fibre loop (with loop delay T) is closed upon itself by two directional couplers. Optical signals injected into the input port I(1) circulate repeatedly around the loop, sending a portion of the recirculating optical wave to the two output ports O(1), O(2). The impulse response of the system consists of a series of decaying pulses equally spaced in time by the round-trip loop delay, T.

The two coupler non-recursive delay line (FIG. 1(b)) also consists of two directional couplers, but in this case the outputs of the first coupler are both fed forward to the second coupler. Here, they are recombined after a delay T, which is the time delay difference between the two feed-forward fibre lines. The impulse response of the system comprises just two pulses, spaced in time by the delay T.

In each case, the frequency-domain behaviour is derived from the impulse response by a Fourier transformation, the characteristic frequency being defined simply by the inverse of the delay time.

With the need to utilise higher frequencies and correspondingly shorter fibre delay lines, the situation is reached where mechanical constraints and bending loss considerations threaten to inhibit further extension in processor frequency range. In particular, development of higher frequency filter structures based on cascaded recirculating 4-Ports is limited by the need to fabricate recursive fibre structures incorporating at least two coupling elements with mechanical dimensions currently incapable of significant further reduction.

The present invention aims to overcome this problem.

The present invention concerns 4-Port couplers and related processor elements fabricated using the polished-coupler evanescent-wave technology. FIG. 2 shows the conventional mechanical configuration utilised hitherto. Preparation of a well defined coupling region in the fibre core is ensured by mounting the fibre within a curved groove machined in a suitable substrate prior to polishing. In current technology, the substrate comprises either a silica block or a silicon V-groove carrier mounted on such a block, although alternative techniques may also be appropriate. Definition of realistic coupler structures requires that the radius of curvature of the groove be relatively large, typically of the order of several hundreds of millimeters. At these radii, geometrical considerations, dictated by the need to bury the entire fibre within the groove at each extremity of the block for mechanical integrity, necessitate the use of substrate blocks measuring some tens of millimeters parallel to the fibre axis. Typical couplers are currently based on blocks 35 mm in length, with fibre curvature radii typically, but not necessarily, in the region 500–1000 mm.

The minimum feasible delay loop thus has a length defined by the sum of the major dimension of the coupler elements and the inter-coupler fibre length, together with a further contribution to permit implementation of bends of reasonable radius. Taken together, these constraints set a minimum practical recursive delay line length somewhat in excess of 100 mm, equivalent to an upper bound of achievable fundamental frequency of less than 2 GHz.

While not necessarily significant in the case of non-recursive lattices, where the characteristic time constant is defined merely by the length difference between the fibres linking two adjacent elements, as indicated in FIG. 1(b), coupler dimensions become critical in recursive lattices.

This invention provides a technique whereby both recursive and non-recursive single and multi-stage fibre lattice structures can be implemented in a simple fashion, free from many of the dimensional constraints encountered in extending current topologies to their limits. In addition, certain structures, conventionally depicted in a non-symmetric configuration, can be fabricated from two identical elements, considerably reducing manufacturing complexity.

The present invention provides a solution to the problem outlined above, based on the observation that the conventional graphical representation of both recursive and non-recursive lattice topologies do not represent the sole physical configuration. Although principally applicable to recursive architectures, the techniques may also be applied to non-recursive structures.

According to the present invention there is provided an optical fibre lattice signal processor comprising at least a first and second optical coupling device, wherein first and second optical fibres are arranged to pass through each optical coupling device permitting optical coupling between the fibres, characterised in that the optical coupling devices are arranged in substantially parallel relationship to each other and each fibre experiences substantially a 180° turn between the optical coupling devices.

Embodiments of the present invention will now be described with reference to the accompanying drawings, wherein.

Figure 3A:
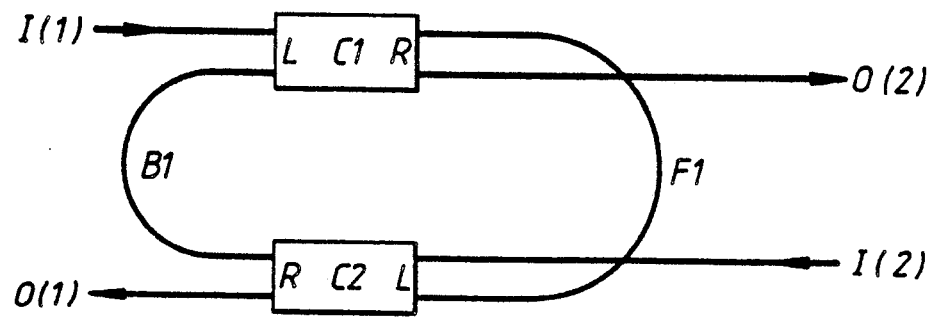
Figure 3B:
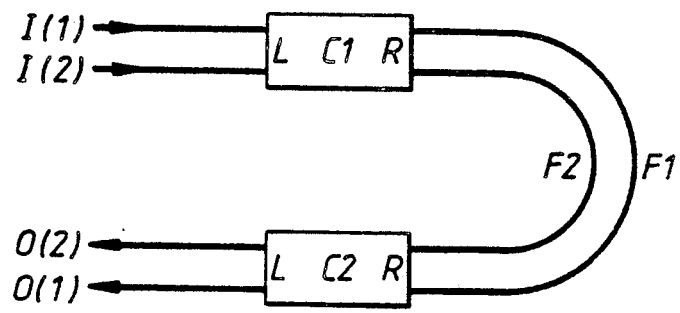
Figure 4:
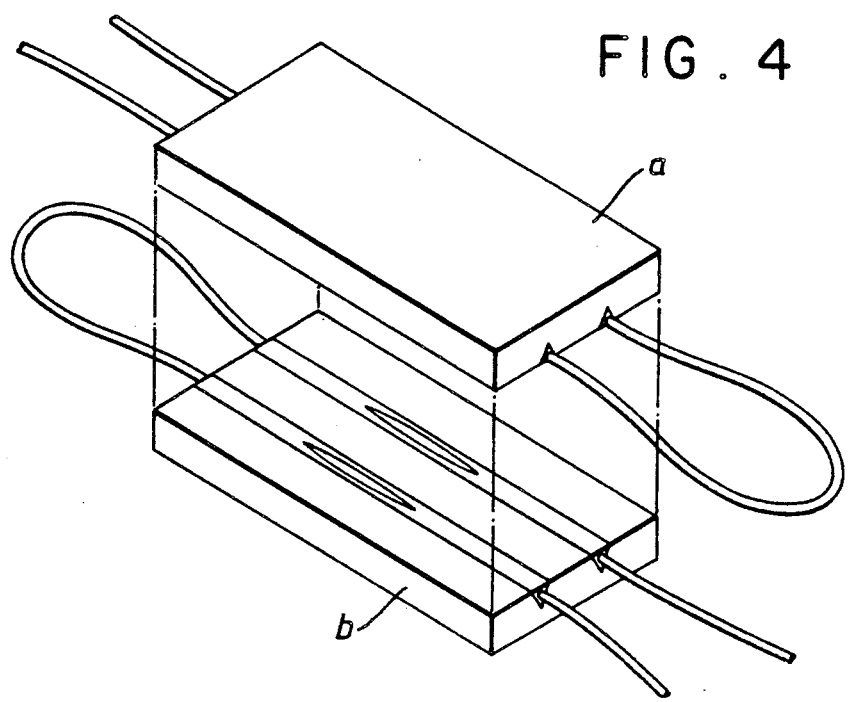
Figure 5A:
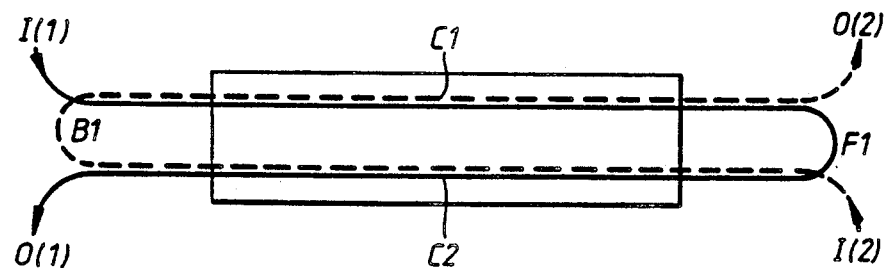
Figure 5B:
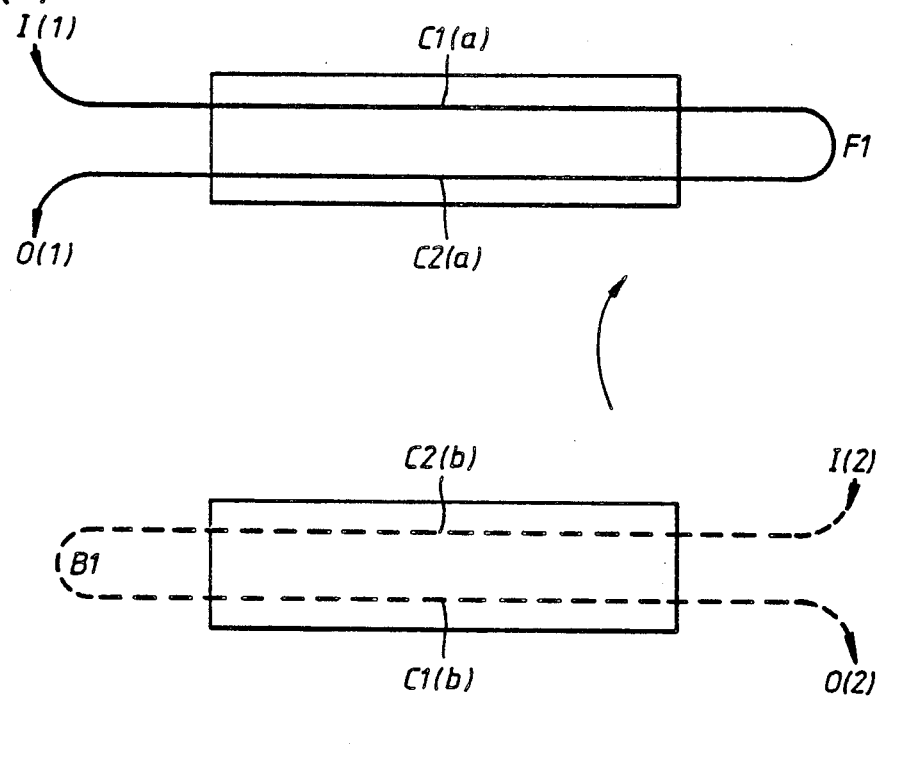
Figure 6A:
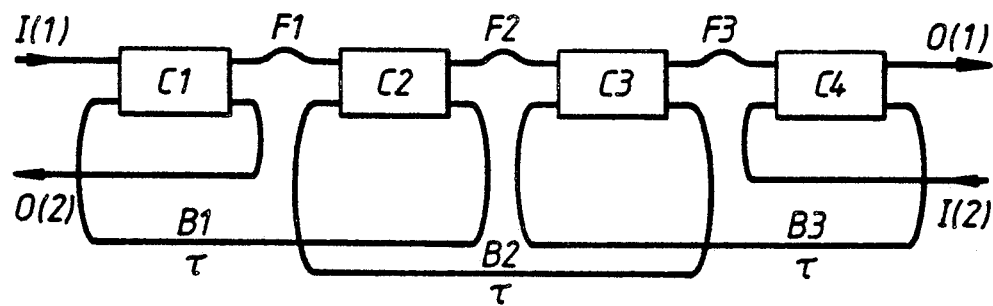
Figure 6B:
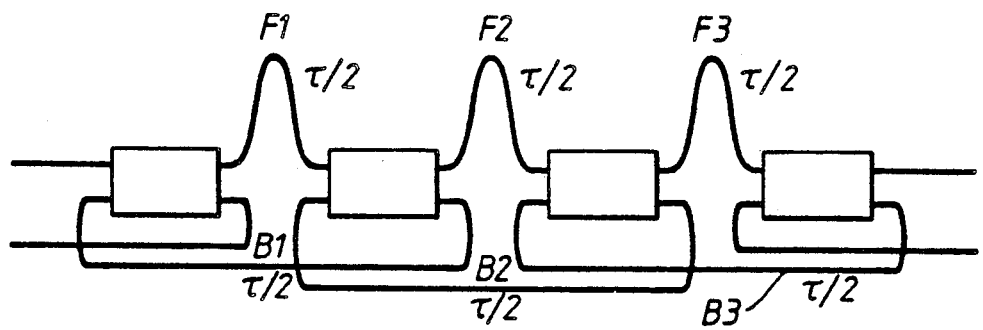
Figure 7A:
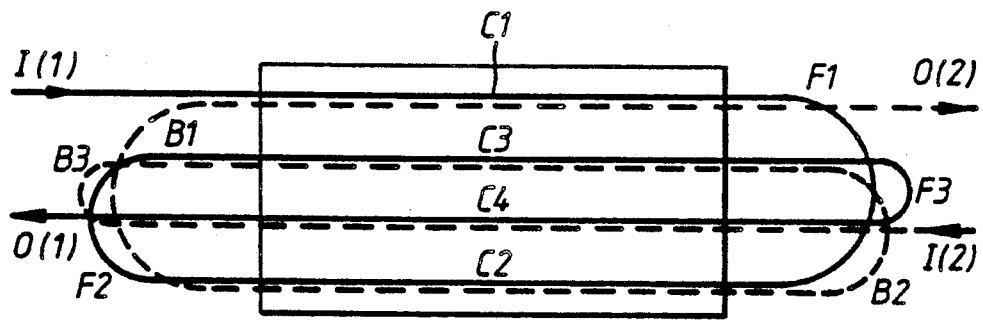
Figure 7B:
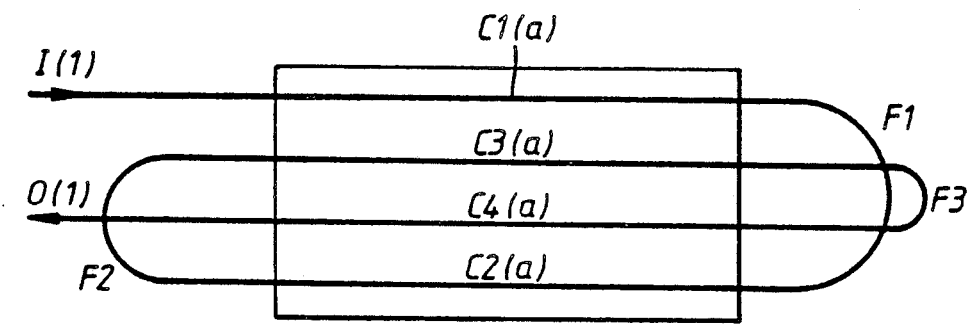
Figure 7C:
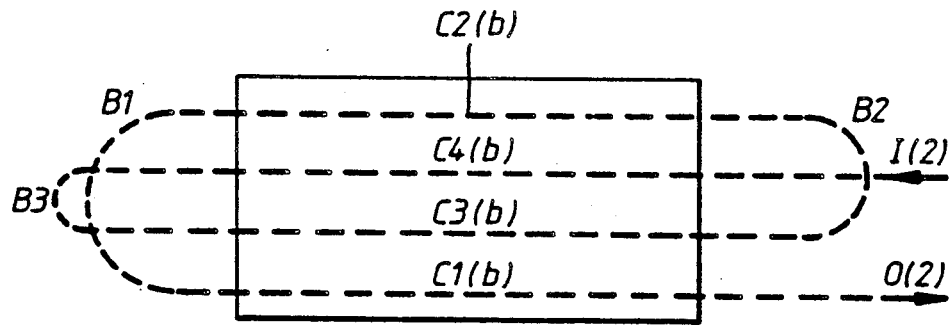
Figure 8A:
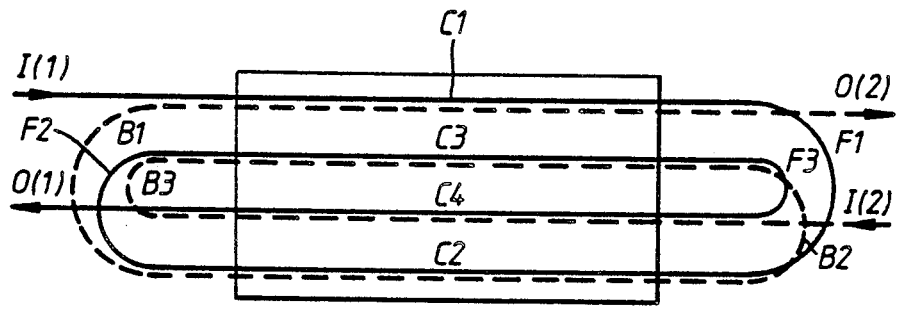
Figure 8B:
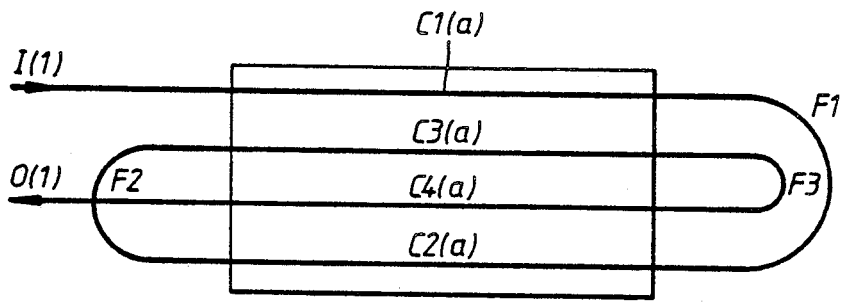
Figure 8C:
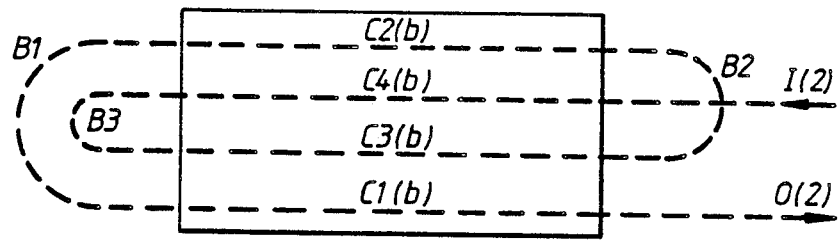

FIG. 3a shows a recursive lattice signal processor according to the present invention, FIG. 3b shows a non-recursive lattice signal processor according to the present invention, FIG. 4 shows the mechanical structure of a monolithic recursive structure, FIGS. 5a and 5b shows the layout of a symmetrical recursive lattice signal processor according to the present invention, in an assembled and unassembled form respectively, FIG. 6a shows a prior art form of a 3-stage recursive lattice signal processor, FIG. 6b shows a 3-stage recursive lattice signal processor according to the present invention, FIGS. 7a and 7b shows a 3-stage lattice signal processor having equal delay in an assembled and unassembled form respectively, and, FIGS. 8a and 8b shows a 3-stage lattice signal processor having arbitrary delays in an assembled and unassembled form respectively.

In the conventional representations, the arrangements of FIG. 1 being typical, the 4-Port elements are viewed as being constructed from arrays of mated pairs of half-couplers. All inter-stage delays are conceptually concentrated on one half of the system, the inter-stage delay on the other half being regarded as negligible.

Analysis of the 4-Port structures shows the following:

Optical power incident at input port I(1) traverses the couplers in order C1–C2, entering each coupler at the left-hand port (L) and exiting at the right hand port (R).

Optical power incident at input port I(2), and any power coupled from the upper to the lower line at either of the couplers C1 or C2, traverses the couplers in the same sense, entering at L and exiting at R. The difference between recursive and non-recursive structures lies solely in the order of traversal, C2–C1 and C1–C2 respectively.

Figure 1A:
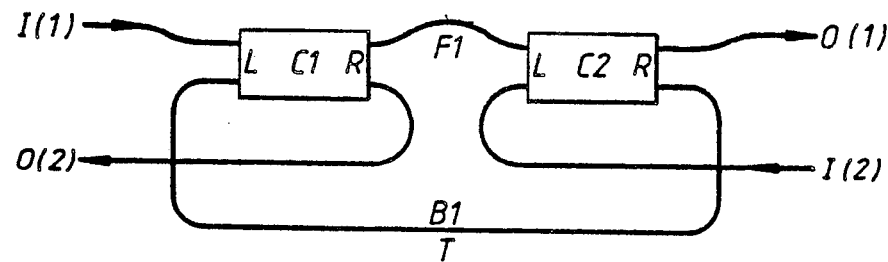
FIG. 1a shows a prior art recursive lattice signal processor.

In the recirculating 4-Port shown in FIG. 1(a) the loop delay path comprises:
(a) the fibre contained within the right-hand half of coupler C2,
(b) the backwards fibre loop B1,
(c) the fibre contained within both left and right-hand halves of coupler C1,
(d) the forward fibre loop B1 and the fibre contained within the left-hand half of coupler C2,
in that order.

Figure 1B:
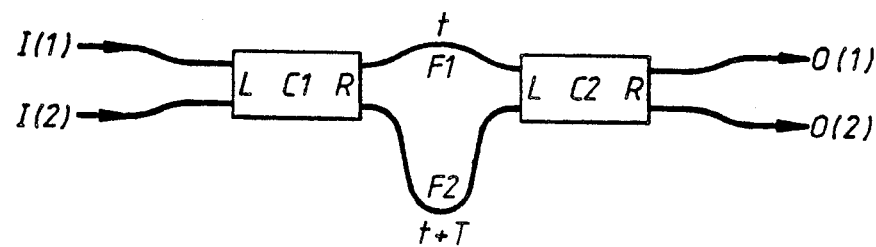
FIG. 1b shows a prior art non-recursive lattice signal processor.
Figure 2:
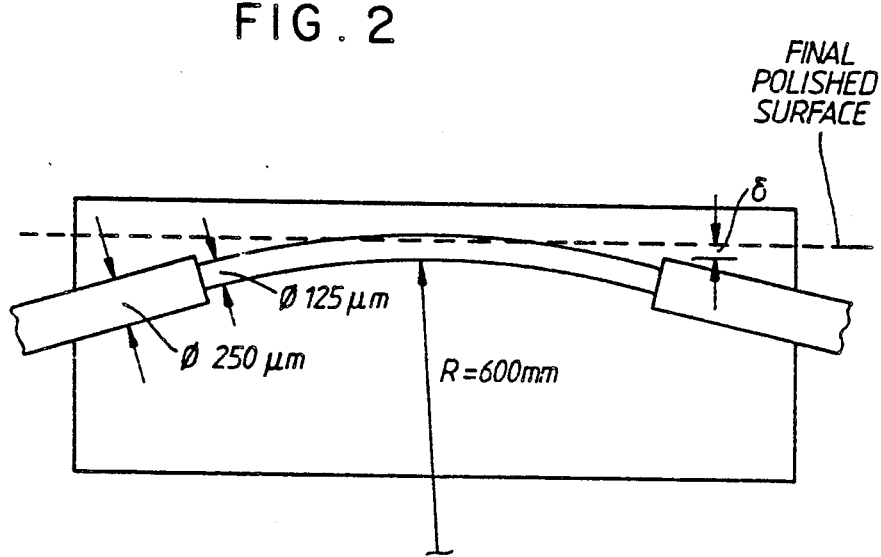
FIG. 2 shows the mechanical configuration of a polished fibre coupler.

In the non-recursive 4-Port shown in FIG. 1(b) the incremental delay is merely the propagation difference between the fibres linking the right-hand ports of C1 and left-hand ports of C2.

While 4-Ports are conventionally depicted with a common orientation, typically with collinear couplers and with forward lines running left-to-right and (in the recursive case) backwards lines running in the opposite sense, this is not an essential pre-requisite for proper functioning. The sole directional criterion is that the two fibres meeting at any particular coupler by properly oriented relative to one another, the relative orientation between coupling elements in the global frame of reference being of no significance. This consideration applies equally to recursive and non-recursive 4-Ports.

The novel topology forming the basis of the present invention overcomes the need to implement a spatial recursion of the type indicated in FIG. 1(a) by disregarding the global orientation between couplers referred to above. This is illustrated in FIG. 3(a) where the couplers C1, C2 of a single recursive 4-Port element are disposed in a parallel rather than a collinear arrangement, the fibres being led along appropriate curved paths to suit the architecture. FIG. 3(b) shows the same concept applied to the non-recursive case.

The structural advantage gained from this novel arrangement is now apparent. Whereas, in the "conventional" recursive topology, the output from C2 had to be led back to the input of C1, a distance approximately equal to the entire length of the 4-Port plus two additional 180 degree turns, all that has to be accomplished in the present invention is a single 180 degree turn. The minimum achievable delay loop length is thus reduced from a figure dictated by a combination of mechanical component dimensions and fibre bend considerations to one constrained by fibre parameters alone.

FIG. 3 depicts both recursive and non-recursive 4-Ports as being comprised of two distinct parallel and counter propagating coupling elements C1, C2. This configuration lends itself to monolithic fabrication of arrays of half couplers, typically but not exclusively, using the use of silicon V-grooves chemically fabricated in a single monolithic substrate. FIG. 4 shows the physical implementation of a recursive monolithic 4-Port, implemented by face-to-face mating of polished dual-fibre half-coupler elements a,b.

Although 4-Port recursive elements are conventionally depicted, and have hitherto been universally fabricated, with the optical delay concentrated in the loop B1, this is not necessary for proper operations of the system. Application of time index techniques widely used in electronic digital filter analysis shows that identical impulse response behaviour is obtained, subject to a global temporal shift equivalent to half of the loop delay, if the total recursive delay is divided equally between the two loop delay, if the total recursive delay is divided equally between the two loops B1 and F1, rather than being concentrated in a single loop.

Applying this topological transformation leads to the symmetrical recursive configuration shown in FIG. 5; although a similar transformation could be applied to the non-recursive case, equalisation of the two loop lengths would lead to a trivial zero-delay situation.

Analysis of the structure reveals that the two physical components, each comprising two half-couplers C1a, C2a and interconnecting fibre, are, in fact, identical. FIG. 5(a) shows the physical layout of the symmetric recursive 4-Port, assumed in this example to be implemented from two dual-fibre V-groove assemblies mated face-to-face. For clarity, the fibres associated with the two halves of the system are shown slightly displaced. FIG. 5(b) shows the lower half-coupler unit disposed as in FIG. 5(a), together with the polished face of the upper half-coupler unit revealed by inversion in the plane of the diagram.

Use of cascades of recursive and non-recursive 4-Ports is a well known technique for tailoring the characteristics of electronic digital filter systems to suit particular requirements. This approach is similarly applicable to optical fibre lattice implementations where the global orientational considerations identical to those outlined above apply equally.

Thus, while multiple stage fibre lattice systems are depicted with a common orientation, typically with all forward lines running left-to-right and all backwards lines running in the opposite sense, this is not an essential pre-requisite for proper processor functioning. The prime directional criterion is again that the two fibres meeting at any particular coupler be properly oriented relative to one another; the relative orientation of coupling elements or entire 4-Ports in the global frame of reference is not significant.

A typical system configuration, illustrated in FIG. 6, shows a 3-stage recursive lattice comprising four directional couplers C1–C4 and associated fibre interconnections F1–F3 and B1–B3. Although couched in terms of this particular configuration, the following discussion is applicable to multi-stage lattices in general; as will be shown, this generality extends to systems in which the inter-stage delays are of unequal length.

FIG. 6(a) shows the conventional representation, the interconnection pattern comprising two distinct series of links. The forward lines F1–F3, are generally depicted as being as short as possible. The recursive or backward lines, B1–B3, conventionally incorporate both the loop delay (by virtue of their increased length relative to the forward lines) and the recursion (by coupling the output port of a downstream coupler to the input of an upstream coupler).

FIG. 6(b) shows the revised topology according to the spirit of the present invention. Here the inter-stage recursive loop delays have been divided equally between the two arrays of half-couplers without prejudicing in any way either the impulse response or the frequency-domain behaviour of the system.

Again, analysis of the structure reveals that the two physical components, each comprising arrays of half-couplers and interconnecting fibre, are, in fact, identical. FIG. 7(a) shows one possible physical layout of the symmetric 3-stage recursive lattice, assumed to be implemented from two multiple-fibre V-groove assemblies mated face-to-face. Provided that the two fibres are coupler in the proper logical sequence, all spactial permutations of groove sequence on the substrates are topologically equivalent. For clarity, the fibres associated with the two halves of the system are shown slightly displaced. FIG. 7(b) shows the lower half-coupler unit disposed as in FIG. 7(a), together with the polished face of the upper half-coupler unit revealed by inversion in the plane of the diagram. The two elements are readily seen to be identical, related in the Figure by a simple 180 degree rotation.

FIG. 8(a) shows a three-stage recursive lattice in which the inter-stage delays are unequal. Specifically, it illustrates a system in which the delay loop lengths are a progressively increasing set of multiples of a common unit, in this case a 5:6:7 sequence, although implementation of any arbitary set of delay lengths is equally possible in this fashion. FIG. 8(b) shows the two mating faces, as discussed above. Again, the two halves of the system are identical, a feature completely independent of the precise relationship between neighbouring loop lengths.

For complete generality, the equal division of the delay loop between the two halves of the system does not represent the sole partitioning arrangement; in principle, any non-equal partitioning is equally capable of implementation using the approach described here.

It will be readily understood by there skilled in the art that the present invention is not limited to the use of four couplers. Any member of couplers may be accommodated within the scope of the present invention, and there disposition relative to each other may vary.

We claim:

1. An optical fibre lattice signal processor comprising at least a first and second optical coupling device, wherein first and second optical fibres are arranged to pass through each optical coupling device permitting optical coupling between the fibres, characterised in that the optical coupling devices are arranged in substantially parallel relationship to each other and each fibre experiences substantially a 180° turn between the optical coupling devices.

2. An optical fibre lattice signal processor as claimed in claim 1 wherein an output of the first optical coupling device is connected to an input of the second optical coupling device by way of said first optical fibre, and an output of the second optical coupling device is connected to an input of the first optical coupling device by way of said second optical fibre.

3. An optical fibre lattice signal processor as claimed in claim 1, wherein first and second outputs of the first optical coupling device are connected to first and second inputs of the second optical fibres, respectively.

4. An optical fibre lattice signal processor as claimed in claim 1, wherein third and fourth optical coupling devices are arranged in parallel relationship to each other and the first and second optical couplers, but located in between the first and second optical coupling devices, and wherein by way of the first optical fibre an output of the first optical coupling device is connected to a first input of the second optical coupling device, a first output of the second optical coupling device is connected to a first input of the third optical coupling device and a first output of the third optical coupling device is connected to a first input of the fourth optical coupling device, and in respect of the second optical fibre, a second output of the fourth optical coupling device is connected to a second input of the third optical coupling device, a second output the third optical coupling device is connected to a second input of the second optical coupling device and a second output of the second optical coupling device is connected to a second input to the first optical coupling device.

5. An optical fibre lattice signal processor as claimed in claim 4 wherein the connection of the first output of the third optical coupling device to the first input of the fourth optical coupling device is of a defined length to impart a defined delay to a signal passing therethrough.

6. An optical fibre lattice signal processor as claimed in claim 4 wherein the connection of the second output of the fourth optical coupling device to the second input of the third optical coupling device is of a defined length to impart a defined delay to a signal passing therethrough.

7. An optical fibre lattice signal processor as claimed in claim 1 wherein each optical coupling device comprises two polished fibre evanescent-wave couplers.

* * * * *